United States Patent [19]

Schaefer et al.

[11] Patent Number: 4,701,602
[45] Date of Patent: Oct. 20, 1987

[54] ADAPTABLE MODULAR STABILIZATION SYSTEM

[75] Inventors: Robert D. Schaefer, Huntington Beach; Paul C. Kiunke, Brea, both of Calif.

[73] Assignee: Hughes Aircraft Company, Los Angeles, Calif.

[21] Appl. No.: 636,894

[22] Filed: Aug. 2, 1984

[51] Int. Cl.⁴ .......................... G01J 1/20; G02B 27/64
[52] U.S. Cl. ...................................... 250/201; 350/500; 244/3.16
[58] Field of Search ............................ 244/3.16, 3.17; 356/141, 152; 250/201, 203 R; 350/500, 522

[56] References Cited

U.S. PATENT DOCUMENTS

| | | | |
|---|---|---|---|
| 3,446,980 | 5/1969 | Meier | 350/500 |
| 3,732,424 | 5/1973 | Wojtulewicz | 250/203 R |
| 4,146,329 | 3/1979 | King et al. | 356/152 |
| 4,270,044 | 5/1981 | Elwell, Jr. | 250/201 |
| 4,326,800 | 4/1982 | Fitts | 250/201 |

FOREIGN PATENT DOCUMENTS 1957905  6/1971  Fed. Rep. of Germany ...... 356/141

*Primary Examiner*—David C. Nelms
*Assistant Examiner*—Michael Messinger
*Attorney, Agent, or Firm*—L. B. Sternfels; R. L. Taylor; A. W. Karambelas

[57] ABSTRACT

An optical sensor system (10), including a two degree of freedom gyro (32) and a beam expander (38) having a predetermined magnification level, is rigidly secured internally to a housing (20). Also mounted within the housing is a prime sensor beam expander (14, 16), having a magnification level equal to that of the gyro beam expander, and a prime sensor detector (30) which form a primary sensor optical path. A steering mirror (24) is interposed between the gyro and prime sensor beam expander. An autocollimator (50), including an angle detector (56), is secured internally to the housing and projects a light beam off one surface (25) of the steering mirror onto the gyro rotor (34), the position of the stabilized reflected light beam being adjusted with respect to a null point on the autocollimator sensor thus to control the steering mirror and, accordingly, to stabilize the primary optical path with respect to the target being detected.

11 Claims, 2 Drawing Figures

ADAPTABLE MODULAR STABILIZATION SYSTEM

BACKGROUND OF THE INVENTION

1. Field of the Invention

The present invention relates to line-of-sight (LOS) control systems and, more particularly, to a two axis optical inertial reference system wherein the rotor of a two degree of freedom gyro is utilized in a modular system to provide a stable line-of-sight reference beam.

2. Description of the Prior Art

Line-of-sight systems have been widely used in the prior art for controlling the alignment of an operating mechanism along an operating axis in the presence of base motion inputs. For example, a gun may have its boresight aligned with a desired target in accordance with the optical axis of a telescope. The telescope is used by the observer for observing a desired target with respect to an orthogonal set of axes which intersect at the optical axis is a reticle attached to the telescope. The gun is typically mounted on a tank, aircraft or ship, which is subject to spurious motions relative to the line-of-sight. The motions tend to obscure the position of the target as viewed by the observer.

Another example is stabilization of line-of-sight of forward looking infrared (FLIR) or TV viewing systems. These systems are typically mounted on moving platforms such as helicopters, aircrafts, tanks, trucks and fighting vehicles. Motion and vibration of the vehicles disturb the optical system's line-of-sight (LOS). Such disturbances to the optical line-of-sight cause the viewing systems' images to become blurred and unuseable.

Conventional practice in achieving stabilized line-of-sight control of an optical system in the presence of base motion inputs is (1) to fabricate the device of expensive, high performance components, (2) to use an extra set of fine, vernier gimbals on which the optical equipment is mounted, (3) to open loop command of a steering mirror in the optical train in response to gyro sensed errors, or (4) to develop a separate, four gimbal platform which generates a stable reference beam to which the line-of-sight of the main optical system (tank sight, FLIR) is slaved.

Each of these conventional methods for achieving increased LOS stability has its disadvantages. Use of more expensive, higher performance components quickly drives the system's cost of impractical values. Even given such components, effects such as bearing seal friction, cable wraps and base motion may still cause unacceptable LOS jitter. Use a second set of fine gimbals will produce dramatic increases in LOS stability but at a price of approximately double or more than that of the original gimballed system. Furthermore, system size and weight are usually more than doubled. The open loop command technique requires very accurate position transducers to allow open loop commands coming from the gyro to stabilize the sensors LOS, which is expensive and provides limited performance improvement.

Use of a separate, gimballed (usually a four gimbal system) stable optical reference will provide the highest degree of line-of-sight stabilization achievable with present state of the art. The separate optical reference may be used in either of two ways: as a light source (a stable light source is mounted on the platform) or as a stable reference flat (a flat is mounted on the platform).

In the first implementation, a reference light beam from the separate stable platform is directed through the optical train of the optical system whose LOS is to be stabilized. An angle detector in that system's optical train detects motion of the reference beam and causes a beam steering mirror in the optical train to move so that the optical system's LOS is stabilized.

In the other implementation, a light source is located in the optical train of the system whose LOS is to be stabilized. The light source is propagated through the optical train and reflected off the flat mounted on the stable platform. The returned beam is sensed by an angle sensor mounted proximally to the light source. Jitter of the return beam at the angle sensor indicates that the components of the optical train are moving. This jitter is sensed by the angle sensor, and an electrical signal is generated which again causes a beam steering mirror to move so as to stabilize the optical train's line-of-sight. In this implementation, the angle sensor, in FLIR systems, is required to be compatible in wavelength with the prime FLIR sensor, a requirement which is difficult to meet with refractive FLIR optics.

Although the stabilized platform, when incorporated into an overall autoalignment system, increases the accuracy to which a line-of-sight may be stabilized, such a platform is relatively heavy and costly, consumes large amounts of electric power, requires a relatively large space or is otherwise bulky and tends to be sensitive to environmental vibration.

The following patents are typical of prior art line-of-sight systems which utilize stable platforms for alignment control. U.S. Pat. No. 4,108,551 to Weber discloses a periscopic apparatus having a stabilized gunsight head positioned externally of a vehicle and a sight tube within the vehicle. A stabilization gyroscope is provided within the gunsight head to stabilize a reflecting mirror and to pivot a casing containing the mirror for bearing purposes by causing a precession of the gyroscope about an appropriate axis. U.S. Pat. No. 3,853,405 to Adler et al. describes a radiant energy device for indicating when a predetermined axis is in line with a source of radiant energy. A telescope arrangement, used on the device, is mounted with a set of gimbals to make the telescope insensitive to movements of a missile incorporating the device. U.S. Pat. No. 3,997,762 to Ritchie et al. discloses a tank fire control system which includes a sighting device and associated drive mechanism, with the gun and sighting drive mechanisms being independent. A gyro reference signal is used for alignment purposes. U.S. Pat. No. 4,062,126 to O'Hara et al provides a system which prevents the dislocation of a target-sight element by utilizing a pair of gyroscopes, each of which includes stabilized platforms to control the element positions. U.S. Pat. No. 3,723,005 to Smith et al. discloses a visual sighting apparatus which utilizes a laser generated aiming device, a gimballed mirror, and a computer which responds to rate tracking and range signals from gyro sensors and the laser aiming device to properly position the gimballed mirror. U.S. Pat. No. 4,027,540 to Allard discusses an inertial optical stabilizer wherein the inner gimbal supports the gyro rotor and a mirror diagonal with a clearance window to admit light. U.S. Pat. No. 3,415,157 to Marchisio et al discloses a gun alignment system having a telscope seeker gimballed for two degrees of motion with respect to a vehicle and rate gyros coupled to the telescope to provide error signals indicating displacement of the telescope from an inertial reference axis. The error signals are utilized both to stabilize the target image in response to spurious motions and to maintain the gun boresight aligned with respect to the inertial reference axis.

Typical other types of line-of-sight alignment systems include the following patents. U.S. Pat. No. 4,020,739 to Piotrowski et al. discloses a fire control system having a flat mirror mounted to the muzzle of a gun to be aimed, and a light source directing a beam of light onto a moveable mirror which reflects the beam normal to the muzzle mirror only in the absence of gun-to-periscope positioning errors for all positions of the gun. The reflected beam from the muzzle mirror is detected to provide error signals which are utilized to position a moveable vehicle in a gunner's periscope so that the gunner may accurately aim the gun. U.S. Pat. No. 3,918,813 to Rossiter describes an optical viewing alignment system in which a reflective beam splitting cube is positioned opposite a collimator. In U.S. Pat. No. 4,142,799 to Barton, a gyro rotor compensates for gun sighting errors due to misalignment between the gun muzzle axis and the optical axis of an associated gun sighting system. A reflector is fixed to the muzzle portion of the gun barrel. U.S. Pat. No. 4,246,705 to Lee discloses a laser-based weapon simulator system for determining the hit/miss occurrences during the simulated firing of the weapon.

Co-pending application Ser. No. 518,982, filed 1 Aug. 1983, and assigned to the assignee of the present invention, describes a line-of-sight alignment system. That system incorporates the advantages of gyroscope stabilized platforms (i.e., high accuracy and stability) without their attendant disadvantages such as high cost, increased power consumption, increased weight, large volume, and the servo errors which are normally associated with a complex control system. Various arrangements of a two-axis optical inertial system using a gyro rotor as a stable reference are disclosed. The gyro is positioned internally to the optical sensor case, and the alignment system requires a plurality of beam splitters and other optical elements which may reduce the optical efficiency of the overall system. In the case of a FLIR system, with the autocollimator alignment beam sharing the prime optical sensor path, the autocollimator sensor must be compatible in wavelength with the prime sensor. This is normally not possible with refractive FLIR optics without placing severe constraints on the wavelength transmissions or reflection capabilities of the prime sensor optical elements. If the gyro is positioned external to the sensor housing, a requirement in certain FLIR systems, vignetting of the sensor viewing aperture may result.

SUMMARY OF THE INVENTION

As an improvement, the present invention provides a LOS stabilization system which incorporates the advantages of the system disclosed in the aforementioned co-pending application, and in which the sensor components are adapted to be positioned within the sensor housing in a manner such that the sensor viewing aperture is not vignetting and in which constraints are not placed on the wavelength transmissions or reflections of the prime sensor optical elements.

Specifically, the present invention provides a LOS sensor system utilizing a two degree of freedom gyro rigidly mounted internally of and secured to the sensor detector housing, and a mirror or other reflective surface mounted on the rotor surface is utilized as a stable optical reference. Sighting on the reference is accomplished by viewing it through a window in the gyro's case. Since the rotor of the gyro reference has a finite angle of travel with respect to the case, the gyro case is hard mounted to the sensor detector housing. An inner, stabilized inertial platform (the gyro rotor) is thus obtained without the necessity of external servoed gimbals because the gyro rotor, due to its own inertia, wants to point in one direction. The gyro torquers are used to precess the spin axis of the rotor. This provides a means for slewing the rotor's spin axis and, hence, the optical system's line-of-sight to the desired direction.

Also mounted internally within the housing are a two-axis precision steering mirror, a two axis autocollimator, a prime sensor detector, a prime sensor beam expander, and a beam expander secured to the gyro case adjacent the case access window. The autocollimator is rigidly attached to the sensor detector housing and projects a beam of light onto the backside of the steering mirror positioned in the sensor optical path between the sensor detector and the sensor beam expander. The beam reflects off the steering mirror with the same optical gain as the gain in the prime sensor optical path. The beam is expanded by the gyro beam expander with the same magnification, or expansion, ratio as the main sensor optical path. The beam strikes the gyro rotor and is projected back to the autocollimator.

The two-axis detector drives the steering mirror to null and the beam on the detector, thus closing the loop between the sensor detector and the stablized rotor. Since the expansion ratio in the autoalignment optical path is identical to that of the prime sensor optical path and both optical paths are using the same steering mirror, the prime sensor optical path becomes stabilized as does the auto alignment optical path. This is accomplished in a closed loop fashion, without having to go through the prime sensor optical path or having to have the autoalignment system located on a central axis of the prime sensor.

Thus, the flexibility of the present invention allows the gyro to be packaged wherever convenient as long as its two axes can be maintained normal to the LOS. The autocollimator can be located wherever convenient outside of the prime optical path so long as it is rigidly attached to the prime sensor detector. The sensor itself is modular in form and is easily mounted to existing equipment. Further, existing LOS devices can be modified relatively inexpensively to incorporate the teachings of the present invention.

The above configuration also allows each optical path to be independently optimized during precision stabilization of the optical system LOS since the magnification levels of each optical path are equal. Further, the light beams are incident on the steering mirror at the same angles from each path, and each of the components are rigidly mounted to the sensor detector housing. Since the expansion ratio in the autocollimator optical path is identical to that of the prime sensor optical path, and since both optical paths each use one side of the same steering mirror, the prime sensor optical path becomes stabilized as the autocollimator optical path becomes stabilized.

The system described hereinabove thus provides for precision stabilization of the LOS of an optical system, and allows for flexibility in component placement, thus eliminating vignetting of the sensor viewing aperture without placing constraints on the waveguide transmission or reflections of the prime sensor optical elements.

BRIEF DESCRIPTION OF THE DRAWING

For a better understanding of the invention as well as further features and advantages thereof, reference is made to the following description, which is to be read in conjunction with the accompanying drawings in which.

BRIEF DESCRIPTION OF THE INVENTION

Figure 1:
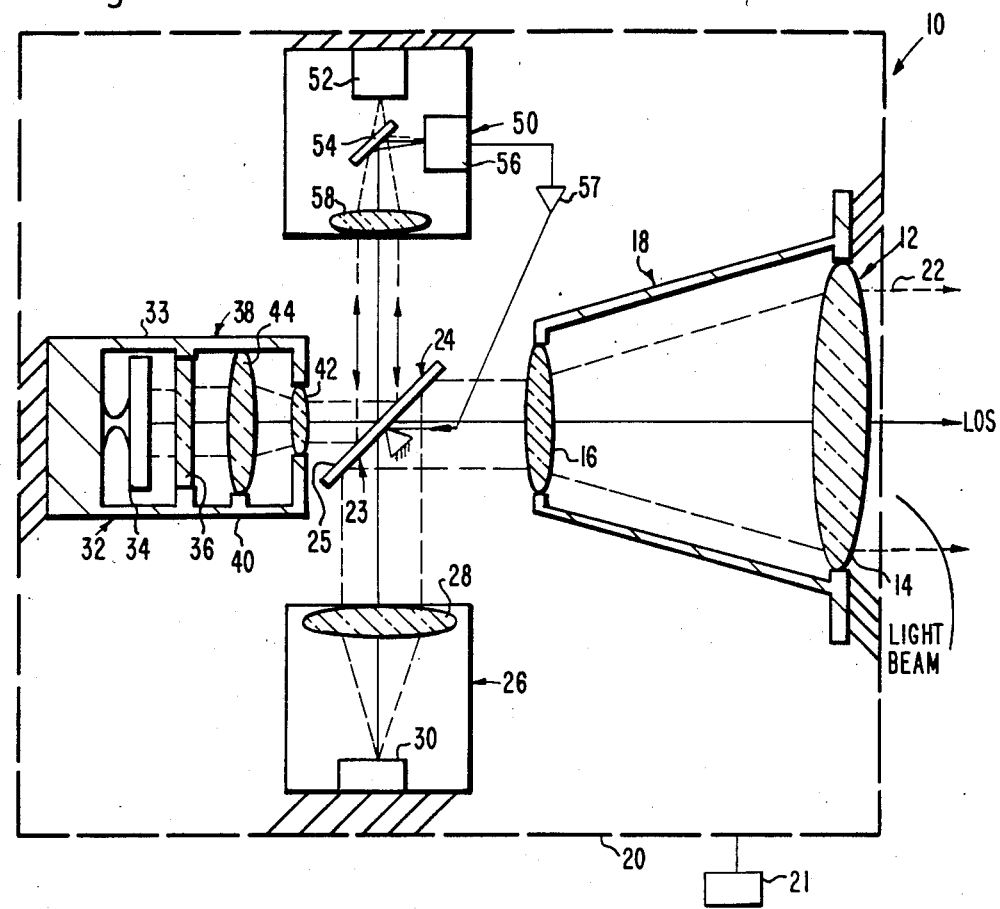
FIG. 1 illustrates, in simplified form, a sensor system in accordance with the teachings of the present invention.

Referring now to FIG. 1, a modularized sensor device 10 includes a FLIR sensor which scans the external environment through a viewing aperture 12. Viewing aperture 12 comprising a grouping of lens elements 14 and 16 mounted within a frame member 18, which in turn is rigidly secured within and to a sensor housing 20 as illustrated, the rigid mounting of a component internally to the sensor housing being represented by the diagonal lines. Housing 20 is mounted on a coarse gimbal, represented schematically by indicium 21. Lens elements 14 and 16, both shown as positive convex lenses, compress a viewing beam 22 incident on lens 14 a predetermined level such that the beam is appropriately positioned on a first surface 23 of a two axis double sided steering mirror 24 interposed in the optical path between aperture 12 and a sensor detector 26. Although the use of single mirror 24 is preferred, other arrangements can be utilized, such as two galvanometer mirrors each having one axis of movement. Incident beam 22 is directed downwardly by mirror 24 to sensor detector 26 which comprises a lens 28 and a germanium detector element 30. The sensor detector is rigidly mounted internally of and secured to housing 20.

In accordance with the teachings of the present invention, a two axis gyro 32, comprising a case 33, a polished rotor 34 and an access window 36 formed in case 33, is rigidly secured in and to housing 20. The utilization of two axis gyro 32 to provide a stabilized reference beam is described in detail in above-mentioned co-pending application Ser. No. 518,982. Two-axis rotor gyro 32 provides a stabilized reference for sensor system 10 by reflecting a light beam off the surface of rotor 34. Although a polished gyro motor is the preferred inertially stabilized reference, any element which is inertially stabilized may be utilized. A beam expander 38, comprising a casing 40 and convex lenses 42 and 44, is rigidly attached to gyro case 33 as illustrated. Lenses 42 and 44 are grouped in such a manner as to provide a magnification level equal to the level provided by lenses 14 and 16 for reasons to be explained below.

A two axis autocollimator 50 is rigidly attached internally to the sensor housing 20. Autocollimator 50 comprises an alignment beam source 52, typically a helium neon laser, a beam splitter 54, a two axis angular detector 56 and a focussing lens 58.

Gyro 32 and the other system components are thus all rigidly mounted to the sensor housing. Since the components are all rigidly mounted together, base motion inputs cause the components to jitter together. Gyro 32 senses the base motion and subtracts out the jitter by the time it reaches detector 26 controlling the position of mirror 24. The target image sensed by detector 26 moves in the identical manner as the movement of the gyro case and, thus, compensates for the lack of jitter stabilization of detector 26. Mirror 24 corrects the jitter as a function of the stable reference received from the polished rotor (the rotor being rigid in output space), resulting in a stabilized image detected by sensor 26.

Alignment beam source 52 projects a beam of light through beam splitter 54 to lens 58 which collimates the beam and projects it onto surface 25 of steering mirror 24, for directing the beam to lens 42. Lenses 42 and 44 in combination expand the beam so that it is incident on rotor surface 34. Lenses 42 and 44 are selected to expand the incident beam at the same magnification level as the magnification level provided by lenses 14 and 16 in the prime snsor optical path. This provides optically coupled paths such that an angular change in rotor position will be accurately reflected in a corresponding change in the LOS to compensate for base motion inputs. The beam incident on the rotor 34 is reflected back to the autocollimator 50 via lenses 44, 42 and steering mirror 24. A portion of the return beam incident on beam splitter 54 is directed to detector 56.

In a typical application, sensor 10 is mounted on a moving vehicle such as a tank. The base motion applied to the tank (and thus to sensor 10) normally causes jitter in the sensor and thus blurs the target image. In order to stabilize the image formed on detector 30, the stabilized reference beam provided by gyro 32 is compared at angle detector 56 with the beam produced by optical source 52. In a manner more fully described in the aforementioned co-pending application, detector 56 optically senses the difference between the angle, which the jitter produces as reflected by the position of the returned reference beam, an electrical null position on the angle detector 56. Detector 56 generates an error signal proportional to the sensed position difference, and the error signal drives mirror 24 through servo amplifier 57 so that the beam from surface 52 is normal to the surface of gyro rotor 34. Mirror 24, in the preferred mode, is suspended on a metal flexor and has magnets mounted thereto. By positioning coils adjacent to the magnets and appropriately energizing a selected coil via the output from servo amplifier 57, mirror 24 is moved to the desired position with a very small friction factor. The gyro rotor is driven by signals supplied to the gyro 32. Since the magnification level in the autoalignment optical path, comprising gyro rotor 34, autocollimator 50 and mirror 24 is selected to be identical to that of the prime sensor optical path and since both optical paths utilize the same steering mirror 24, the prime sensor optical path becomes stabilized just as the autoalignment optical path. Thus, stabilization is accomplished in a closed loop fashion without the necessity of an autoalignment beam passing through the prime sensor optical path or having autocollimator 50 located on the central axis of the prime sensor 26. Gyro 32 can be mounted at any position as long as the two gyro axes are normal to the LOS.

An important feature of the present invention is that, since each optical path is optically independent of the other, each of the components in the path can be separately optimized. All that is required for the system to operate and provide for LOS stabilization is that the magnification levels for each optical path be the same, that the light beams incident on mirror 24 are incident at the same angle (the optically aligned viewing aperture and gyro provides this feature) and that components 12, 26, 32, and 50 are rigidly mounted to the sensor housing 20, with the face of the rotor surface being maintained normal to the target.

Figure 2:
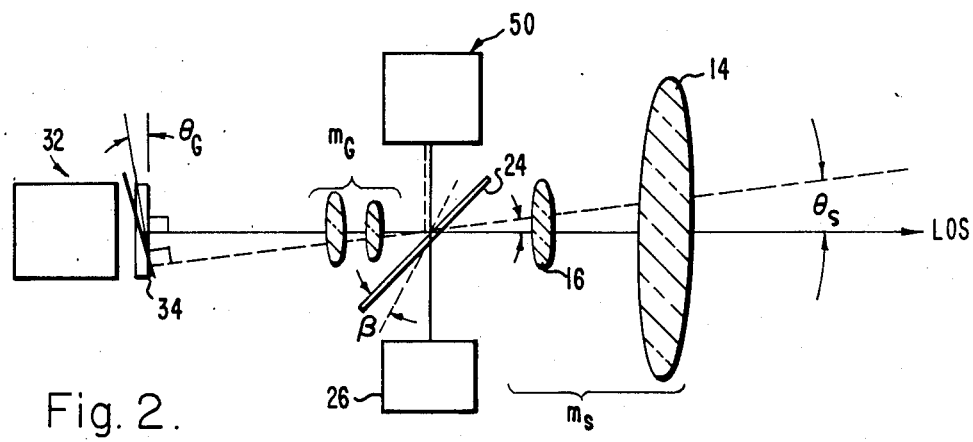
FIG. 2 is a simplified representation of the FIG. 1 system.

FIG. 2 shows, in simplified form, the interaction of gyro 32 and the prime sensor optical path. In the figure, $\theta_G$ represents the angular movement of the gyro rotor away from the normal which occurs when the rotor is precessed a new position based upon new target information or the gyro case is moved by motion of the base; $m_G$ represents the magnification level of lenses 42 and 44, $\beta$ represents the angle by which steering mirror 24 has been rotated, $m_S$ represents the magnification level of lenses 14 and 16, and $\theta_S$ represents the angular stabilization provided by the new position of steering mirror 24 (the angle to be corrected for).

In accordance with principles of geometric optics, $\theta_G = 2\beta/m_G$ and $\theta_S = 2\beta/m_S$. Thus, $\theta_G = \theta_S$. Accordingly, the new position assumed by rotor 34, accurate typically within the range of 10 microradians, is rapidly transmitted to the primary sensor optical path such that effective targets LOS is quickly sensed by sensor 30. This is accomplished much more rapidly than if another coarse gimballed device were used in place of the gyro.

The present invention thus has the distinct advantage of yielding vernier stabilization internal to an optical sensor system by utilizing a two degree of freedom gyro with a polished rotor, an autocollimator, a beam expander and a small steering mirror. The vernier steering internal to the sensor allows the sensor to be mounted to the coarse pointing gimbal; consequently, an additional set of gimbals for isolating the sensor from base motion input is not required. By utilizing the optical magnification of the beam expander in conjunction with the polished rotor gyro, the autoalignment beam need not be transmitted through the sensor optics which normally would place constraints on the wavelength transmission or reflections of the prime sensor optical elements inasmuch as the helium neon wavelength is not compatible with the response characteristics of the germanium sensor particularly in FLIR sensor system. In the particular configuration illustrated, by sampling surface 25 of the steering mirror 24 and front surface 23 for the prime sensor, the stabilization function provided by autocollimator 50 can be positioned anywhere within sensor housing 20, rather than to a specific location as otherwise would be required if alignment were through the sensor optics.

The present invention, although incorporated in a sensor device, may be utilized in any optical system wherein a stabilized reference is requried. For example, the sensor detector could be replaced with a light source for target illumination or with a video camera for television applications.

While the invention has been described with reference to its preferred embodiment, it will be understood by those skilled in the art that various changes may be made and equivalents substituted without departing from the spirit and scope of the invention. In addition, many modifications may be made to adapt a particular situation or materials to the invention without departing from its essential teachings.

What is claimed is:

1. An optical path line-of-sight stabilization system for viewing a target comprising:
   a housing;
   means defining a first optical path and its line-of sight and having first means secured to said housing for sighting the target and obtaining information thereof and second means secured to said housing for detecting the target information;
   means defining a second optical path including an inertially stabilized element secured to said housing and having a reflective surface, and a source secured to said housing for providing a beam of electromagnetic energy which is directed to and reflected from said reflective surface of said inertially stabilized element;
   an adjustable beam steering mirror having first and second reflective surfaces respectively positioned in the first and second optical paths respectively between said first and second means of said first optical path means and between said source and said inertially stabilized element, said mirror first reflective surface reflecting electromagnetic energy between the target and said second means and said mirror second reflective surface directing the electromagnetic energy beam to and reflecting the electromagnetic energy beam from said inertially stabilized element; and
   adjusting means coupled to said adjustable beam steering mirror and including an angle detector secured to said housing and positioned to receive the electromagnetic energy beam from said source and reflected from said reflective surface of said inertially stabilized element for responding to changes in position of said inertially stabilized element and for producing an error signal for driving said adjustable beam steering mirror and thereby for enabling substantially normal reflection and stabilization of the beam from said element reflective surface.

2. The system of claim 1 wherein said electromagnetic energy source comprises a laser.

3. The system of claim 1 wherein said housing has means defining an opening and a first grouping of lens elements positioned adjacent said opening means.

4. The system of claim 1 wherein said adjustable beam steering mirror comprises a two-axis mirror.

5. The system of claim 1 wherein said inertially stabilized element comprises a two degree of freedom gryo having a gyro rotor and said element reflective surface is on said gyro rotor.

6. The system of claim 5 wherein said gyro rotor is rotatable about a spin axis and said gyro reflective surface is positioned normal to the spin axis.

7. The system of claim 5 wherein said gryo rotor comprises a stable reference flat and said source provides an autoalignment beam for reflection from said reference.

8. The system of claim 1 wherein said angle detector is responsive to the angular position of the beam reflected from said reflective surface of said inertially stabilized element for generating the error signal which is proportional to the difference between an electrical null position on said angle detector and the angular position of said reflected beam.

9. The system of claim 8 wherein said adjusting means includes a servo amplifier responsive to said error signal for adjusting said beam steering mirror to reduce said error signal substantially to zero corresponding to when the energy reflected from said element reflective surface is normal thereto.

10. The system of claim 8 further comprising means for maintaining the position of said element substantially constant, the electrical null position on said angle detector being displaced due to any base motion effects on said housing.

11. The system of claim 10 wherein said error signal is proportional to the difference between the displaced electrical null position on said angle detector and the angular position of said reflected beam.

* * * * *